April 27, 1965 L. WIEDMANN ET AL 3,180,469
SPRING-PRESSED CLUTCH WITH ELECTROMAGNETIC RELEASE
Filed Dec. 14, 1960
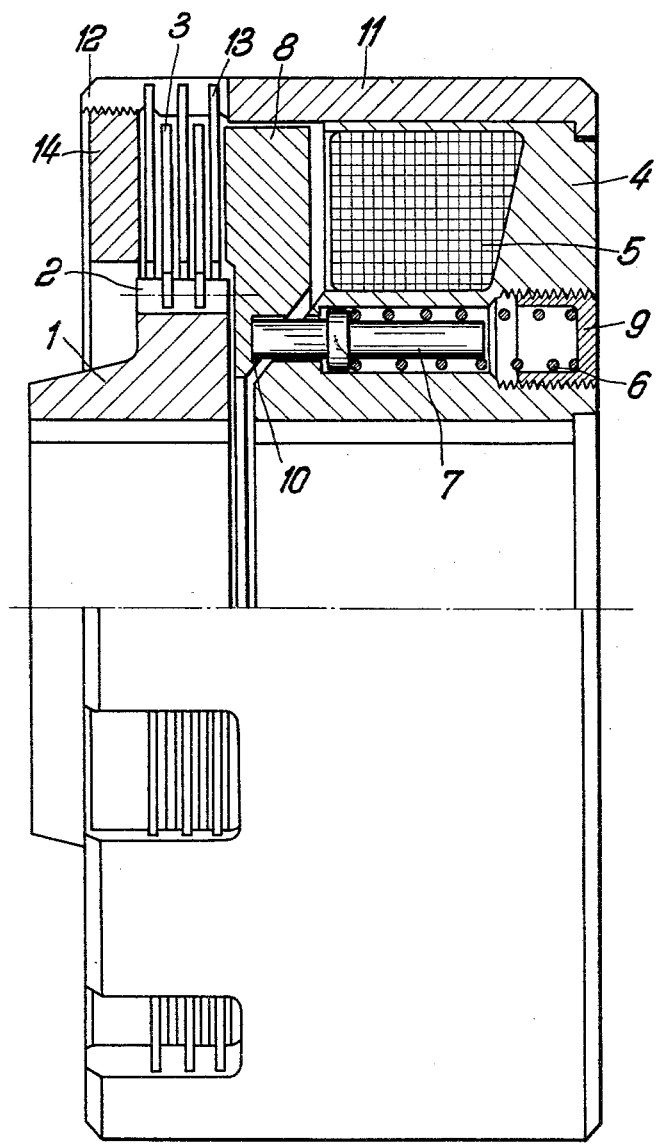

3,180,469
SPRING-PRESSED CLUTCH WITH ELECTRO-
MAGNETIC RELEASE
Ludwig Wiedmann and Paul Leschhorn, Friedrichshafen,
Germany, assignors to Zahnradfabrik Friedrichshafen,
Aktiengesellschaft, Friedrichshafen, Germany
Filed Dec. 14, 1960, Ser. No. 75,853
9 Claims. (Cl. 192—90)

This invention relates to clutches and more particularly to that type of clutch which uses frictionally engaging rings or disks wherein engagement of the disks is effected by spring pressure, and disengagement is effected by an electromagnetic solenoid overcoming spring pressure.

It is an object of the invention to provide a spring pressure type of clutch of simple design and high efficiency by novel direction of flux paths from a solenoid used to disengage the clutch.

It is another object of the invention to provide an improved friction disk clutch having novel means for adjusting or regulating contact pressure of the friction disks.

Briefly, the invention comprises a solenoid construction having a clutch ring to which are splined alternate disks, such clutch ring forming a part of the body of the solenoid. An armature is utilized in conjunction with the solenoid, which armature is spring pressed to force a disk assembly into engagement for clutching purposes. The solenoid can retract the armature against the spring pressure for effecting disengagement. A particularly important feature of the invention is the shape of the armature and the inner solid core of the solenoid, being of complementary conical shape, so that the effective width of the air gap perpendicular to the walls thereof is smaller than the possible maximum travel of the armature, a small air gap making for a strong magnetic pull on the armature to overcome the spring pressure at the very beginning of the movement of the armature.

Further construction of the clutch contemplates means for adjusting the spring pressure engagement and additional means for regulating the initial spacing between plates by the use of an outer disk threaded to the clutch ring which can be moved axially to shift the plates to any position relative the armature within the spacing provided.

Specific construction of the invention further contemplates housing the armature within the clutch ring which clutch ring, as noted above, fully encloses the solenoid, whereby flux passes from the clutch ring radially into the armature at its outer edge.

The spring pressure on the armature for effecting engagement is transmitted through pins or bolts preferably of non-magnetic material in order to avoid any short circuit of the magnetic flux lines.

A detailed description of the invention will now be given in conjunction with the appended drawing, and other objects and features of the invention will be apparent from such descriptions.

Referring now to the drawing, which shows an elevation, partially in cross section, of a clutch embodying the features of the invention, a drive element 1 is provided with splines 2 to which are slidably keyed inner disks 3 frictionally engageable with outer disks 13 in turn slidably keyed by splines 12 to a ferro-magnetic housing ring 11. Threadedly carried by the housing ring 11 is an adjustable pressure plate 14 in the form of a ring and it will be understood that rotation of plate 14 can effect inward movement thereof to move the plates into closer proximity to each other, and thus closer to the armature 8 in order to adjust the degree of pressure during engagement action as effected by a series of angularly spaced bolts or pins 7 biased by respective springs 6 acting against armature 8, and supporting it relative the clutch axis.

The clutch ring or housing 11 fully encompasses a solenoid 5 and is fixed, for example pressed on to a magnet body 4 housing the solenoid. However, the clutch ring 11 can also form an integral part of the magnet body. It will be noted that ring 11 substantially encompasses the periphery of the armature 8 having a small air gap with respect thereto.

Compression of springs 6 may be adjusted by means of threaded caps 9, screwed into the magnet body. The pins 7 are preferably non-magnetic in order to not interfere with the flux path, and may be received at their left hand ends within suitably provided respective bores of armature 8, or armature 8 may be provided with an annular groove into which the pins 7 protrude.

The inner opening of armature 8 is of conical shape, as shown at 10, generally complementary to the conical shape of the forwardly extending left hand end of the magnet body 4 shown in proximity to the surface 10. Thus, the flux path from the solenoid circulates through ring 11, armature 8, and magnet body 4, passing the air gap between the complementary, conically shaped surfaces. The peripheral area of the flux path from ring 11 to armature 8 is substantially the same as the flux path area between the adjoining complementary, conical surfaces, thus facilitating transfer of flux from the armature to the magnet body without difficulty or restriction, while at the same time the air gap normal to the conical surfaces is less than the axial travel of the magnet, which is important in a spring pressed clutch so as to effect as strong a pull as possible on the armature in order to ensure full release against the bias of the springs.

From the above description, the operation of the clutch will be obvious. Thus, when solenoid 5 is de-energized, springs 6 press armature 8 against the clutch disks to effect engagement, the degree of engagement or frictional force exerted between the disks being regulated by the position of adjusting ring 14 and the compression in the springs as effected by the respective adjusting caps 9. When, however, the solenoid is energized, such energization will be understood to be sufficient to overcome the pressure of several springs in order to draw the armature back for release of the mutually engaging clutch disks, the pins 7, of course, being pressed toward the right by movement of the armature 8 in that direction. The double adjusting effect of spring compression as effected by caps 9 and disk spacing, as effected by ring 14, is particularly advantageous to maintain a desired contact pressure for whatever purpose the clutch is to be used, and adjustment of either plate spacing or spring pressure, or both, may be made with considerable precision to produce a desired torque transmitting effect and to compensate for wear of the disks.

Having thus described our invention, we are aware that various changes may be made without departing from the spirit thereof, and accordingly, we do not seek to be limited to the precise illustration herein given except as set forth in the appended claims.

We claim:

1. A clutch comprising a frictionally engageable disc, means, spring means for effecting engagement thereof, electromagnetic solenoid means for effecting disengagement thereof, an armature on which said spring means acts to effect said engagement, said armature being disposed to be drawn by said solenoid means to effect disengagement, and said solenoid means comprising a magnet body, a solenoid within said body, a clutch ring forming part of the flux path to said armature and surrounding said armature substantially solidly at a peripheral edge thereof and being closely spaced with respect to said armature whereby flux passes radially from said clutch ring to said armature through a predetermined area on said peripheral edge, said armature having an inwardly radially spaced conical area closely spaced to a complementally shaped conical area of said magnet body, the space between said clutch ring and said peripheral edge area of said armature forming an air gap, the space between said conical areas forming an air gap, said air gaps being disposed to transmit flux through substantially equal areas.

2. A clutch as set forth in claim 1, said clutch ring forming an integral part of said magnet body and surrounding said magnet body and extending axially therefrom to encompass said peripheral edge of said armature.

3. In a clutch as set forth in claim 1, including means for axially shifting said disc means to compensate for wear thereof so as to maintain a predetermined air gap between said complementally conical areas.

4. A clutch as set forth in claim 1, said clutch ring having fingers extending beyond said armature, wherein certain of said disk means are slidably keyed to said fingers.

5. A clutch as set forth in claim 1, said clutch ring having fingers extending beyond said armature, wherein certain of said disk means are slidably keyed to said fingers, and an axially adjustable element carried by said fingers and engageable with said disk means for varying the spacing therebetween, said disk means being disposed intermediate said adjustable element and said armature.

6. A clutch as set forth in claim 5, said adjustable element comprising a ring having a periphery threadedly engageable with the inner surfaces of the extremities of said fingers.

7. A clutch as set forth in claim 1, said clutch ring surrounding said magnet body and said solenoid and extending therefrom and encompassing said armature at a peripheral edge thereof whereby flux passes through said clutch ring and radially through said armature to return to said magnet body.

8. A clutch as set forth in claim 1, said clutch ring having portions extending beyond said friction plates, and a reaction plate comprising a ring having threaded engagement with said clutch ring portions so as to be rotated for axial displacement with respect to said disk means.

9. A clutch comprising frictionally engageable disk means, spring means for effecting engagement thereof, electromagnetic solenoid means for effecting disengagement thereof, an armature on which said spring means acts to effect said engagement, said armature being disposed to be drawn by said solenoid means to effect disengagement, and said solenoid means comprising a magnet body, a solenoid within said body, a clutch ring integrally carried on said magnet body forming part of the flux path to said armature and surrounding said armature at a peripheral edge thereof and closely spaced with respect to said edge whereby flux passes from said ring to said armature through said peripheral edge, said armature having a central area closely spaced to an area of said magnet body for transmission of flux therebetween, said armature and said magnet body areas effecting a flux path area substantially equal to the flux path area from said ring to the periphery of said armature, said spring means comprising a plurality of arcuately spaced pins carried by said magnet body and extending into said armature for support thereof and being slidably movable with respect to said magnet body, said pins being made of a non-magnetic material.

References Cited by the Examiner
UNITED STATES PATENTS

| | | | |
|---|---|---|---|
| 1,172,917 | 2/16 | Thomas | 188—171 |
| 2,344,111 | 11/39 | Ryba | 192—84 |
| 2,803,323 | 8/57 | Newell. | |
| 2,875,876 | 3/59 | Rudisch | 192—90 |
| 2,936,053 | 5/60 | Reucker | 192—84 |
| 3,036,680 | 5/62 | Jaeschke. | |

DAVID J. WILLIAMOWSKY, *Primary Examiner.*

THOMAS J. HICKEY, *Examiner.*